US 6,578,932 B2

(12) United States Patent
Sakata

(10) Patent No.: US 6,578,932 B2
(45) Date of Patent: Jun. 17, 2003

(54) HYDRAULIC BRAKE APPARATUS FOR A VEHICLE

(75) Inventor: Yasunori Sakata, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/076,438

(22) Filed: Feb. 19, 2002

(65) Prior Publication Data

US 2002/0121807 A1 Sep. 5, 2002

(30) Foreign Application Priority Data

Feb. 19, 2001 (JP) ........................................ 2001-041629

(51) Int. Cl.$^7$ ............................ B60T 8/44; B60T 13/74; B60T 13/20; B60T 13/12
(52) U.S. Cl. ............................ 303/114.1; 303/3; 303/10; 303/166; 303/DIG. 4; 303/113.3; 188/358
(58) Field of Search ........................ 303/3, 166, DIG. 3, 303/DIG. 4, 114.1, 114.2, 116.1, 119.1, 113.1, 122.12, 10, 122.13, 122.14, 113.3, 113.2, 113.4, 191, 138, 192, 193, 155, DIG. 1; 188/358, 359; 60/547.1; 701/71, 82, 70

(56) References Cited

U.S. PATENT DOCUMENTS

| 5,498,070 | A | | 3/1996 | Inagawa et al. |
| 6,135,577 | A | | 10/2000 | Ishii |
| 2002/0030404 | A1 | * | 3/2002 | Nitta et al. ............. 303/122.12 |
| 2002/0096936 | A1 | * | 7/2002 | Ishida et al. ............. 303/114.1 |
| 2002/0096939 | A1 | * | 7/2002 | Sakata et al. ............. 303/119.1 |

\* cited by examiner

*Primary Examiner*—Douglas C. Butler
(74) *Attorney, Agent, or Firm*—Burns, Doane, Swecker & Mathis, LLP

(57) ABSTRACT

A vehicle hydraulic brake apparatus includes a controller and a hydraulic pressure detector which detects a master cylinder hydraulic pressure produced by a master cylinder. The controller compares the master cylinder hydraulic pressure detected by the hydraulic pressure detector with a predetermined pressure value, implements operation of the auxiliary hydraulic pressure source when the depressing operation of the brake operating member is judged to be in a stage where the detected master cylinder hydraulic pressure is above the predetermined pressure value, and terminates the operation of the auxiliary hydraulic pressure source when the master cylinder hydraulic pressure detected by the hydraulic pressure detector is stabilized at an approximately fixed pressure value after being increased.

15 Claims, 7 Drawing Sheets

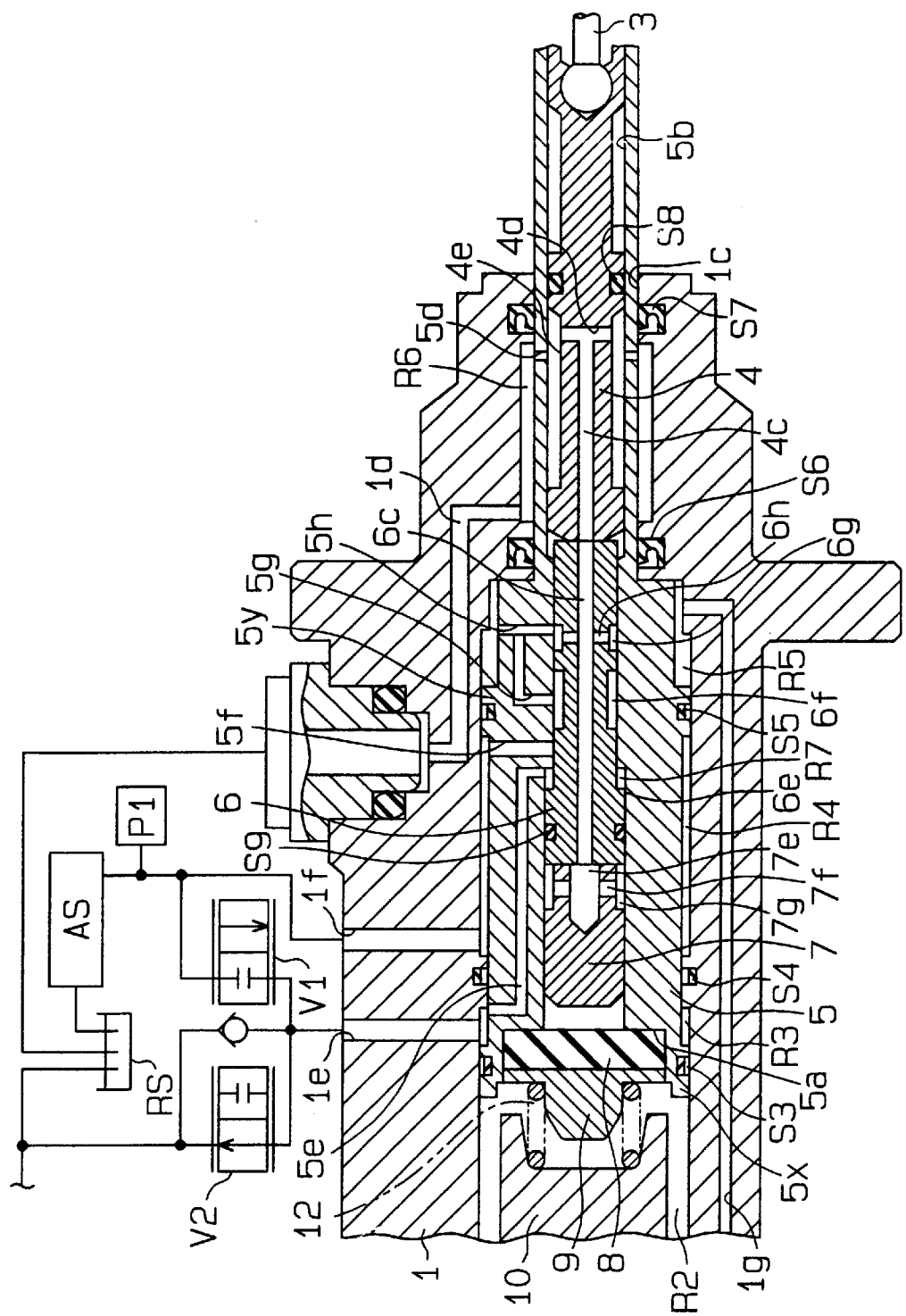

HYDRAULIC BRAKE APPARATUS FOR A VEHICLE

This application is based on and claims priority under 35 U.S.C. § 119 with respect to Japanese Application No. 2001-041629 filed on Feb. 19, 2001, the entire content of which is incorporated herein by reference.

FIELD OF THE INVENTION

This invention generally relates to a hydraulic brake apparatus for a vehicle. More particularly, this invention pertains to a vehicle hydraulic brake apparatus provided with an auxiliary hydraulic pressure source and a master cylinder having a master piston, with the master piston being driven by power hydraulic pressure supplied from the auxiliary hydraulic pressure source.

BACKGROUND OF THE INVENTION

There are a variety of known vehicle hydraulic brake apparatus, one of which is disclosed in U.S. Pat. No. 6,135,577 (corresponding to Japanese Patent Laid-Open Publication No. 11-34859). This patent describes a vehicle hydraulic brake apparatus employing a pump operation control apparatus. The pump operation control apparatus is adapted to operate a pump (an auxiliary hydraulic pressure source) in response to each braking operation of a brake operating member and to release the pump after a predetermined time has elapsed or in response to a release of the brake operating member. Therefore, the pump operation control apparatus can always maintain an accumulator pressure at a predetermined pressure level.

More specifically, when a brake switch has been switched on, the operation of the pump is started. After the predetermined time has elapsed from the moment at which the brake switch has been switched on, the operation of the pump is interrupted. If the brake switch is continuously switched on after the predetermined time has elapsed, the pump is operated for a time extended from the predetermined time until the brake switch is switched off. If the brake switch is again switched on before the predetermined time elapses, the pump is operated until the predetermined time elapses from the moment at which the brake switch has again been switched on.

U.S. Pat. No. 5,498,070 (corresponding to Japanese Patent Publication No. 2849972) describes a fluid pressure boosting type brake system that is designed to drive a fluid pump (an auxiliary hydraulic pressure pump) in accordance with the consumption of fluid pressure in a brake device and reliably ensure sufficient fluid pressure in a fluid pressure source. The fluid pump is adapted to be driven in response to a pressure value detected by a pressure detector when the pressure detector is in a normal state. On the other hand, should the fluid pump not be controlled based upon the detected pressure value by the pressure detector, the fluid pump can be driven in response to the consumption of the fluid pressure corresponding to the braking operation. For example, should the fluid pump not be controlled based upon the detected pressure value by the pressure detector, the fluid pump can be driven on and off for each preset time with a predetermined period while the braking operation has been performed.

Considering the pump operation control apparatus disclosed in U.S. Pat. No. 6,135,577 and Japanese Patent Laid-Open Publication No. 11-34859, the pump is operated for the predetermined time after the braking operation is detected, i.e., after the brake switch was switched on. Therefore, the accumulator pressure may be increased excessively. To overcome this drawback or prevent the occurrence of such a possibility, the operation of the pump is interrupted when a relief valve is operated, when the electric current of the motor for operating the pump becomes equal to or above a predetermined value, or when the number of revolutions of the motor becomes equal to or below a predetermined value. However, this requires a mechanism for detecting the electric current or for detecting the number of revolutions, or other similar devices, thus leading to an increase in the number of components.

With respect to the fluid pressure boosting type brake system disclosed in U.S. Pat. No. 5,498,070 and Japanese Patent Publication 2849972, the fluid pump is operated on and off so that the fluid pressure in the fluid pressure source may be excessively increased or sufficient fluid pressure may not be ensured in the fluid pressure source. Further, the method used to estimate the consumption of the fluid pressure corresponding to the braking operation may not be accurately performed due to, for example, the road surface condition.

Accordingly, the pump operation control apparatus and the fluid pressure boosting type brake system are still susceptible of certain improvements with respect to appropriately controlling the operation of the auxiliary hydraulic pressure source to decrease the load applied to the auxiliary hydraulic pressure source.

SUMMARY OF THE INVENTION

A hydraulic brake apparatus for a vehicle includes a brake operating member, a master cylinder including a master piston which is movable in the forward direction in response to the depressing operation of the brake operating member for pressurizing brake fluid in a reservoir and outputting a master cylinder hydraulic pressure to a wheel brake cylinder mounted on a vehicle wheel in response to the movement of the master piston in the forward direction, and an auxiliary hydraulic pressure source for pressurizing the brake fluid in the reservoir to a first predetermined pressure level and for outputting a power hydraulic pressure. The hydraulic brake apparatus also includes a regulating means, a hydraulic pressure detecting means, and a control means.

The regulating means is connected with the auxiliary hydraulic pressure source and the reservoir for regulating the power hydraulic pressure outputted from the auxiliary hydraulic pressure source to a second predetermined pressure level for driving the master piston by the regulated power hydraulic pressure, and for terminating the regulating operation when the regulated hydraulic pressure becomes equal to a reaction force of the master cylinder relative to the master piston. The hydraulic pressure detecting means detects the master cylinder hydraulic pressure. The control means compares the master cylinder hydraulic pressure detected by the hydraulic pressure detecting means with a predetermined pressure value, implements operation of the auxiliary hydraulic pressure source when the depressing operation of the brake operating member is judged in a stage where the detected master cylinder hydraulic pressure is above the predetermined pressure value, and terminates operation of the auxiliary hydraulic pressure source when the master cylinder hydraulic pressure detected by the hydraulic pressure detecting means is stabilized at an approximately fixed pressure value after being increased. The regulating means is preferably in the form of a hydraulically actuated booster device.

The hydraulic pressure detecting means detects the master cylinder hydraulic pressure every fixed predetermined period of time, and the control means compares the difference between the master cylinder hydraulic pressure detected by the hydraulic pressure detecting means at a previous time and the master cylinder hydraulic pressure detected by the hydraulic pressure detecting means at a present time with a predetermined value. The operation of the auxiliary hydraulic pressure source is terminated when the difference is maintained below the predetermined value for a predetermined period of time or more than that.

According to another aspect, the hydraulic brake apparatus for a vehicle includes a brake operating member, a master cylinder including a master piston which is movable in the forward direction in response to the depressing operation of the brake operating member for pressurizing brake fluid in a reservoir and outputting a master cylinder hydraulic pressure to a wheel brake cylinder mounted on a vehicle wheel in response to movement of the master piston in the forward direction, and an auxiliary hydraulic pressure source for pressurizing the brake fluid in the reservoir to a predetermined pressure level and for outputting a power hydraulic pressure. The hydraulic brake apparatus also includes master piston driving means, linear solenoid valve means, control means, and hydraulic pressure detecting means.

The master piston driving means drives the master piston with the power hydraulic pressure outputted from the auxiliary hydraulic pressure source, while the linear solenoid valve means controls the power hydraulic pressure supplied to the master piston driving means from the auxiliary hydraulic pressure source. The control means performs an operation control of the linear solenoid valve means based upon predetermined electric current regardless of the depressing operation of the brake operating member and performs an auto-braking control by adjusting the master cylinder hydraulic pressure. The hydraulic pressure detecting means detects the master cylinder hydraulic pressure. The control means operates the auxiliary hydraulic pressure source when the auto-braking control is performed and terminates operation of the auxiliary hydraulic pressure source when the master cylinder hydraulic pressure detected by the hydraulic pressure detecting means is maintained at an approximately fixed pressure value after being increased.

The auto-braking control includes at least one of a brake steering control for restraining an oversteer or an understeer of the vehicle, a traction control for restraining an acceleration slip of a driving wheel when the vehicle is accelerated, a vehicle distance control for controlling a vehicle distance from the vehicle towards a forward running vehicle and a down-hill control for controlling a vehicle speed to be a predetermined vehicle speed during the vehicle running on the down-hill.

Preferably, the hydraulic pressure detecting means detects the master cylinder hydraulic pressure every fixed predetermined period of time. The control means compares the difference between the master cylinder hydraulic pressure detected by the hydraulic pressure detecting means at a previous time and the master cylinder hydraulic pressure detected by the hydraulic pressure detecting means at a present time with a predetermined value, and terminates operation of the auxiliary hydraulic pressure source when the difference is maintained below the predetermined value for a predetermined period of time or more than that.

According to a further aspect, a method hydraulic braking for a vehicle involves pressurizing brake fluid in a reservoir through forward movement of a master piston in a master cylinder in response to a depressing operation of the brake operating member to output a master cylinder hydraulic pressure to a wheel brake cylinder mounted on a vehicle wheel, detecting the master cylinder hydraulic pressure, pressurizing the brake fluid in the reservoir to a first predetermined pressure level through operation of an auxiliary hydraulic pressure source to output a power hydraulic pressure, regulating the outputted power hydraulic pressure to a second predetermined pressure level to produce a regulated power hydraulic pressure and terminating regulation of the power hydraulic pressure when the regulated hydraulic pressure becomes equal to a reaction force of the master cylinder relative to the master piston, driving the master piston with the regulated power hydraulic pressure, comparing the detected master cylinder hydraulic pressure with a predetermined pressure value, operating the auxiliary hydraulic pressure source when depression of the brake operating member is judged to be in a stage in which the detected master cylinder hydraulic pressure is greater than the predetermined pressure value, and terminating operation of the auxiliary hydraulic pressure source when the detected master cylinder hydraulic pressure is stabilized at a substantially fixed pressure value after being increased.

The operation control of the auxiliary hydraulic pressure source can be relatively easily and appropriately performed by the hydraulic pressure detecting means. Therefore, there is no need to provide an additional detecting means. Further, the load applied to the auxiliary hydraulic pressure source can be decreased.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 7 is a cross-sectional view illustrating a hydraulic booster according to an embodiment of the invention.

DETAILED DESCRIPTION OF THE INVENTION

Figure 1:
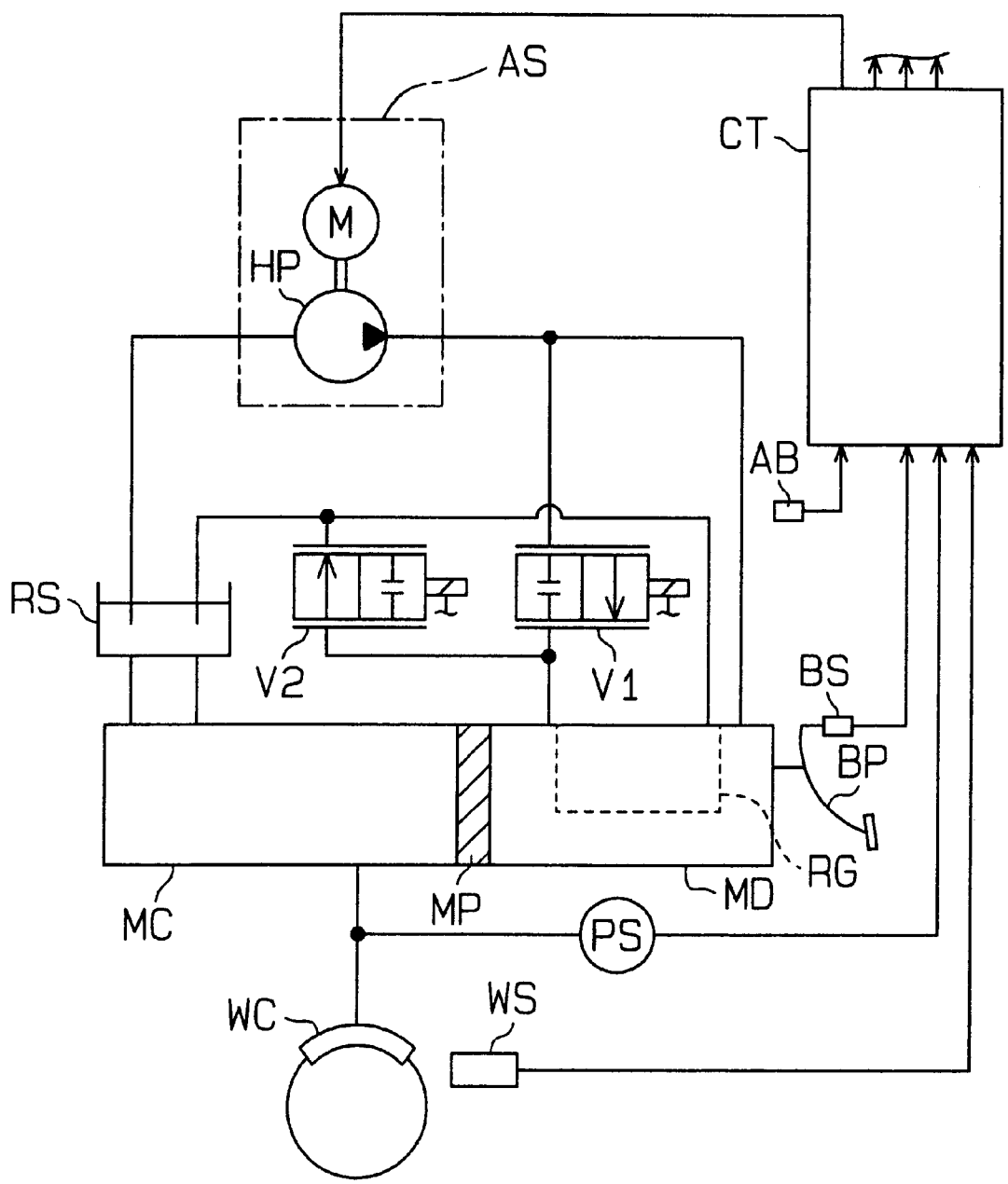
FIG. 1 is a schematic illustration of a hydraulic brake apparatus according to an embodiment of the invention.

Referring to FIG. 1, a hydraulic brake apparatus according to a first embodiment is provided with a master cylinder MC including and an auxiliary hydraulic pressure source AS. The master cylinder MC is provided with a master piston MP that is moved forward (i.e., to the left in FIG. 1) in response to a depressing operation of a brake pedal BP (a brake operating member). Brake fluid from a reservoir RS is thus pressurized in the master cylinder MC so that a brake hydraulic pressure is outputted from the master cylinder MC to each wheel brake cylinder WC mounted on each respective vehicle wheel.

The auxiliary hydraulic pressure source AS increases the brake fluid in the reservoir RS to a predetermined pressure level and outputs a power hydraulic pressure. The auxiliary hydraulic pressure source AS is provided with a hydraulic pressure pump HP and an electric motor M for driving the hydraulic pressure pump HP. Further, the hydraulic brake apparatus is provided with a master piston driving means MD for driving the master piston MP using the power hydraulic pressure outputted from the auxiliary hydraulic pressure source AS. The master piston driving means MD includes a regulating means RG illustrated by a broken line in FIG. 1. The regulating means RG is connected to the auxiliary hydraulic pressure source AS and is further connected to the reservoir RS. The regulating means RG is employed for regulating the power hydraulic pressure outputted from the auxiliary hydraulic pressure source AS to meet a predetermined pressure level and for driving the master piston MP with the regulated hydraulic pressure. The operation of the regulating means RG is interrupted when the regulated hydraulic pressure becomes equal to a reaction force of the master cylinder MC relative to the master piston MP.

The hydraulic brake apparatus is also provided with a linear solenoid valve unit for controlling the power hydraulic pressure supplied from the auxiliary hydraulic pressure source AS to the master piston driving means MD. The linear solenoid valve unit is comprised of a normally closed type linear solenoid valve V1 and a normally open type linear solenoid valve V2. The linear solenoid valve V1 opens and closes a hydraulic pressure supplying passage connecting the master piston driving means MD with the auxiliary hydraulic pressure source AS. The linear solenoid valve V2 opens and closes a hydraulic pressure discharging passage connecting the master piston driving means MD with the reservoir RS. The operation control of the linear solenoid valves V1, V2 is implemented by an electronic control device CT based upon a predetermined electric current, regardless of the depressing operation of the brake pedal BP. Therefore, a master cylinder hydraulic pressure is adjusted to effect an auto-braking control. A control means is included in the electronic control device CT illustrated in FIG. 1 according to this embodiment of the present invention and is employed for controlling the ON/OFF operation of the auxiliary hydraulic pressure source AS and for performing auto-braking control.

A hydraulic pressure sensor PS is connected to a hydraulic pressure passage between the master cylinder MC and the wheel brake cylinder WC. The hydraulic pressure sensor PS, which serves as a hydraulic pressure detecting means, detects the master cylinder hydraulic pressure outputted from the master cylinder MC. The master cylinder hydraulic pressure detected by the sensor PS is compared with a predetermined pressure value. When the master cylinder hydraulic pressure detected by the sensor PS exceeds the predetermined pressure level, the brake pedal BP is judged to have been depressed and the operation of the auxiliary hydraulic pressure source AS is commenced. The master cylinder hydraulic pressure detected by the sensor PS is thus increased and then is stabilized at an approximately fixed pressure value.

As described above, the illustrated embodiment of the auxiliary hydraulic pressure source AS is constructed with the hydraulic pressure pump HP and the electric motor M. An accumulator AC can also be included at the outlet side of the hydraulic pressure pump HP as descried later with reference to FIGS. 6 and 7. In addition, although in the embodiment described above the linear solenoid valves V1, V2 are controlled by the electronic control device CT for performing the auto-braking control, the linear solenoid valves V1, V2 can be omitted with respect to a normal brake apparatus in which the auto-braking control is not performed.

As illustrated in FIG. 1, the hydraulic brake apparatus is further provided with a wheel speed sensor WS for detecting a vehicle wheel speed, a brake switch BS turned on and off in response to the depressing operation of the brake pedal BP, an automatic brake switch AB. The automatic brake switch AB is turned on by a driver for performing the auto-braking control. Signals outputted from the above described sensors and switches are supplied to the electronic control device CT.

Figure 2:
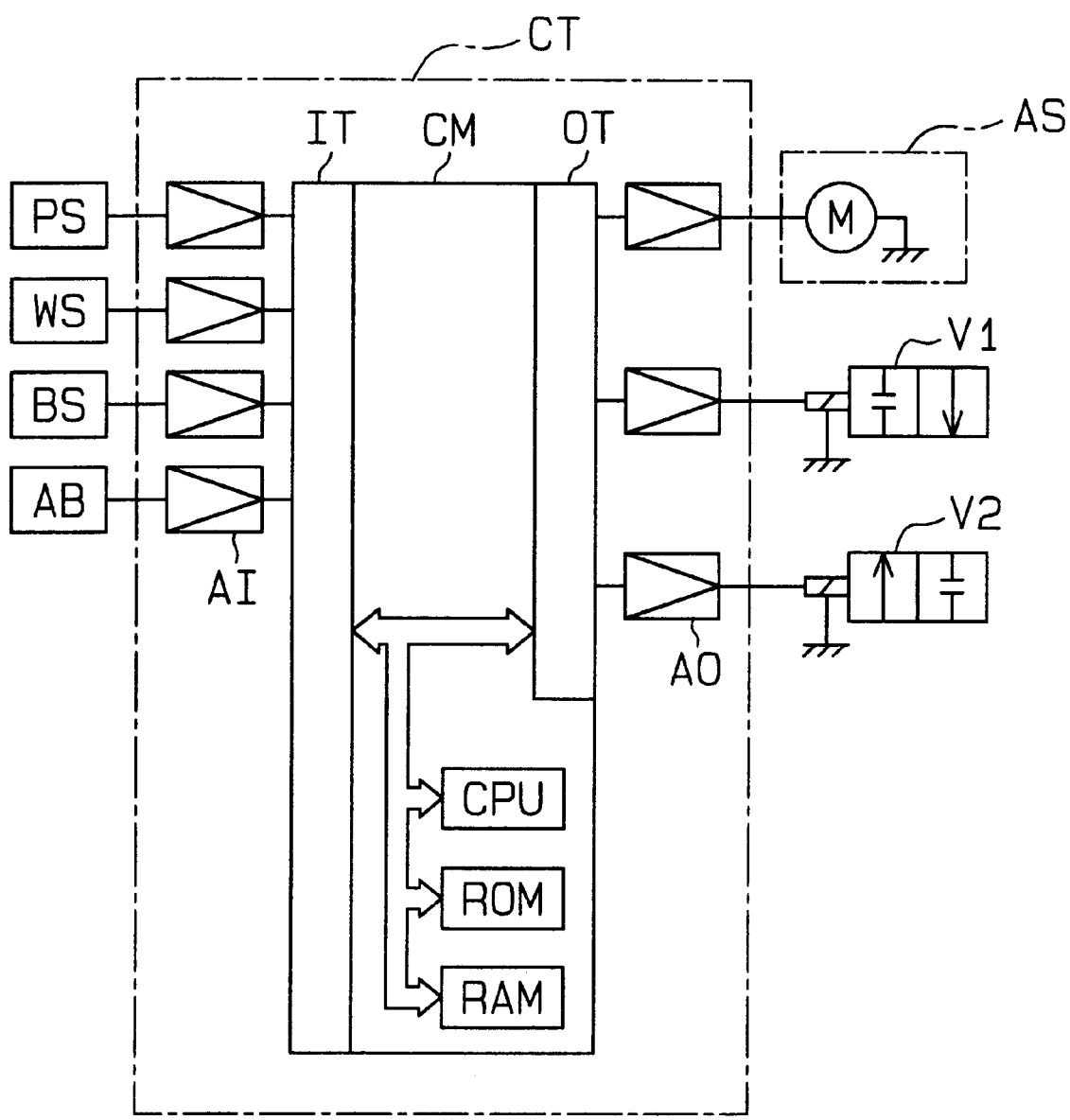
FIG. 2 is a schematic illustration of the control means used in the hydraulic brake apparatus illustrated in FIG. 1.
Figure 3:
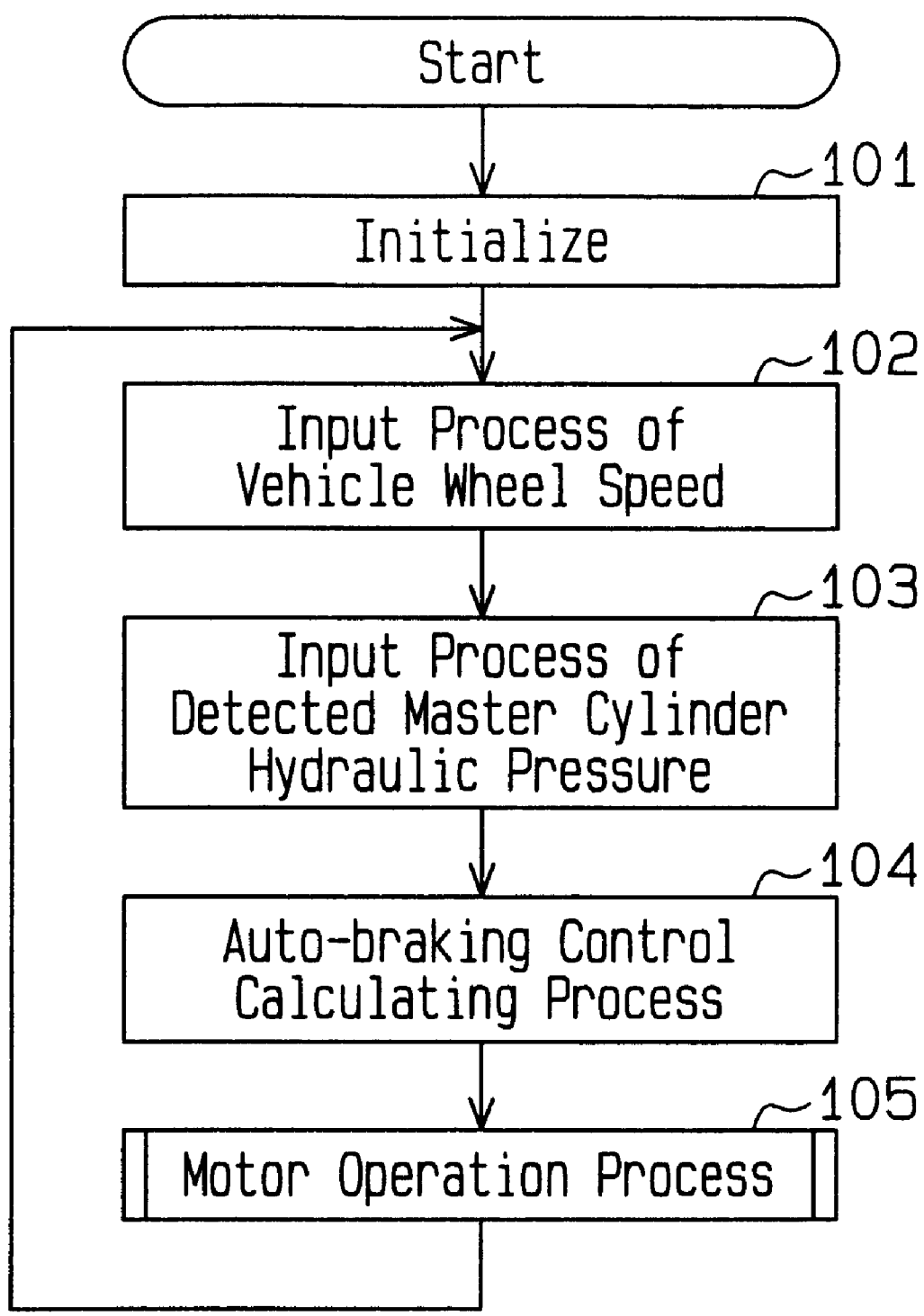
FIG. 3 is a general flow chart of the auto-braking control carried out in conjunction with the hydraulic brake apparatus illustrated in FIG. 1.
Figure 4:
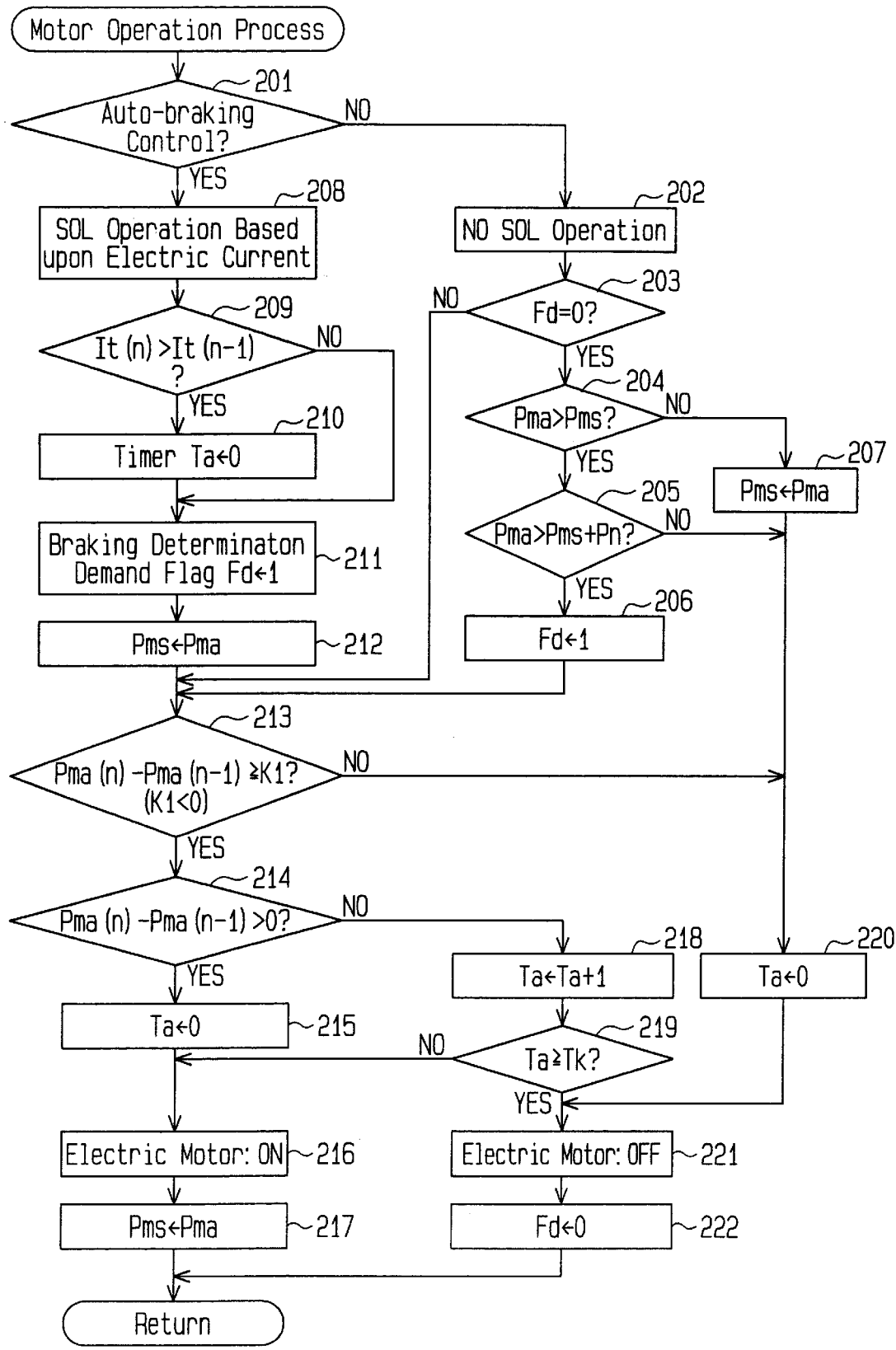
FIG. 4 is a flow chart of the electric motor operation sub-routine performed in the flow chart shown in FIG. 3.

As illustrated in FIG. 2, the electronic control device CT is comprised of a microcomputer CM provided with a central processing unit CPU, a read only memory ROM, a random access memory RAM, an input interface IT, and an output interface OT which are connected via a bus. The signals outputted from the hydraulic pressure sensor PS, the wheel speed sensor WS, the brake switch BS and the automatic brake switch AB are inputted to the CPU via amplifying circuits AI and the input interface IT. The electric motor M is also operatively connected to the electronic control device CT. Control signals are supplied to the electric motor M via the output interface OT and a driving circuit AO to control the operation of the electric motor M. Electric current is supplied to each linear solenoid valve V1, V2 via the driving circuit AO. Programs corresponding to the flow charts illustrated in FIGS. 3 and 4 are memorized in the ROM. The CPU performs or carries out the programs while an ignition switch is in the ON condition. The RAM temporarily memorizes variable data required to perform the programs.

According to the disclosed and illustrated embodiment of the hydraulic brake apparatus, a series of processes for performing the auto-braking control is implemented by the electronic control device CT. When the ignition switch is in the ON condition, predetermined programs are commenced by the microcomputer CM. Hereinafter, the auto-braking control is described with reference to the flow charts illustrated in FIGS. 3 and 4.

Referring to the general flow chart illustrated in FIG. 3, the microcomputer CM is first initialized at step 101 to clear various calculated values. More specifically, the master cylinder hydraulic pressure detected by the hydraulic pressure sensor PS and memorized by the RAM is cleared to zero. A braking determination demand flag Fd which is described in more detail below is reset at zero. An auto-braking control flag representing that the auto-braking control has been performed is reset to zero. Further, the electric current applied to the linear solenoid valve V1 is reset to zero.

At step 102, an input process of the vehicle wheel speed detected by the wheel speed sensor WS is implemented. If necessary, an estimated vehicle speed is calculated and the estimated vehicle speed is differentiated to determine an estimated vehicle acceleration. Further, at step 103, an input process of the master cylinder hydraulic pressure detected by the sensor PS is implemented. The step 103 is followed by step 104. At step 104, an auto-braking control calculating process is implemented. At step 105, an operation process of the electric motor M is implemented.

With respect to the auto-braking control calculating process at step 104, the auto-braking control initiating and terminating determinations are implemented in accordance with the vehicle movement condition. The electric current applied to the linear solenoid valves V1, V2 is determined with reference to a map (not shown) based upon a target master cylinder hydraulic pressure determined in accordance with the vehicle movement condition.

FIG. 4 shows the sub-routine for carrying out the electric motor M operation process in step 105 of FIG. 3. At step 201, the microcomputer CM first judges whether or not the auto-braking control has been performed. That is, the microcomputer CM judges whether or not the auto-braking control flag has been set. When the auto-braking control flag has not been set, such as in a first cycle or when a normal braking operation has been performed, the program proceeds to step 202 in which the linear solenoid valves V1, V2 are not operated. Then, at step 203, a determination is made regarding whether the braking determination demand flag Fd has been reset to zero. The program proceeds to step 204 in the first cycle under the flag Fd being reset at zero. A master cylinder hydraulic pressure Pma at the time is compared with a memorized pressure value Pms as the latest pressure value of the master cylinder hydraulic pressures that have been already memorized by the RAM.

At step 204, when the master cylinder hydraulic pressure Pma is judged to be larger than the memorized pressure value Pms, the program proceeds to step 205 to compare the master cylinder hydraulic pressure Pma with a threshold pressure value (Pms+Pn). The threshold pressure value is determined by adding a predetermined value Pn for noise removal to the memorized pressure value Pms. When the master cylinder hydraulic pressure Pma is judged to be larger than the threshold pressure value (Pms+Pn), the master cylinder hydraulic pressure Pma is increased, wherein the brake pedal BP is judged to have been depressed. At step 206, the braking determination demand flag Fd is set at "1". The program then proceeds to step 213.

On the other hand, when the master cylinder hydraulic pressure Pma is judged at step 204 to be equal to or below the memorized pressure value Pms, the program proceeds to step 207. At step 207, the memorized pressure value Pms is up-dated by memorizing the master cylinder hydraulic pressure Pma at that time. Step 207 is then followed by steps 220, 221 and 222 to return to the main routine illustrated by the flow chart in FIG. 3. Further, when the master cylinder hydraulic pressure Pma is judged at step 205 to be equal to or below the threshold value (Pms+Pn), step 205 is also followed by steps 220, 221 222 to return to the main routine illustrated by the flow chart in FIG. 3.

When the microcomputer CM determines at step 201 that the auto-braking control has been performed, the program proceeds to step 208 to operate the linear solenoid valves V1, V2 based upon an electric current It(n) at this time that is preset at step 104 in FIG. 3. Then, at step 209, the electric current It(n) is compared with a previous electric current It(n−1). When the electric current It(n) is larger than the previous electric current It(n−1), the program proceeds to step 210 to clear a timer Ta to zero. The program then proceeds to step 211. The timer Ta is employed for counting the elapsed time from a time at which the master cylinder hydraulic pressure Pma is stabilized at an approximately or substantially fixed value. The timer Ta is counted up or incremented at step 218 as described later. When it is determined in step 209 that the electric current It(n) is equal to or below the electric current It(n−1), the program directly proceeds to step 211 to set the braking determination demand flag Fd to "1". Next, at step 212, the memorized pressure value Pms is updated by memorizing in the RAM the master cylinder hydraulic pressure Pma. Step 212 is then followed by step 213.

At step 213, a difference (Pma(n)−Pma(n−1)) between the master cylinder hydraulic pressure Pma(n) at this time and the previous master cylinder hydraulic pressure Pma(n−1) is compared with a negative predetermined value K1. When the difference (Pma(n)−Pma(n−1)) is judged to be smaller than the predetermined value K1 (<0), the master cylinder hydraulic pressure is judged to have been rapidly decreasing. Therefore, the program proceeds to step 220 to clear the timer Ta to zero. At step 221, the operation of the electric motor M is turned OFF.

On the other hand, when the difference (Pma(n)−Pma(n−1)) is judged at step 213 to be equal to or above the predetermined value K1, the program proceeds to step 214 to determine whether or not the master cylinder hydraulic pressure Pma(n) is larger than the previous master cylinder hydraulic pressure Pma(n−1) (i.e., whether the difference (Pma(n)−Pma(n−1) is greater than zero). When the master cylinder hydraulic pressure Pma(n) is judged to be larger than the previous master cylinder hydraulic pressure Pma(n−1), the master cylinder hydraulic pressure is judged to have been increasing. The program thus proceeds to step 215 to clear the timer Ta to zero. The operation of the electric motor M is then commenced at step 216. In the following step 217, the memorized pressure value Pms is updated by memorizing the master cylinder hydraulic pressure Pma in the RAM, i.e. the maximum value is updated. The program then returns to the main routine illustrated in FIG. 3.

When the master cylinder hydraulic pressure Pma(n) is judged to be equal to or below the previous master cylinder hydraulic pressure Pma(n−1) at step 214, the master cylinder hydraulic pressure Pma is judged to have been maintained at a fixed pressure level or has been decreasing at a slow speed. In this case, the program proceeds to step 218 to count up the timer Ta by an increment (Ta+1). At step 219, the timer Ta is compared with a predetermined time Tk. When the timer Ta is below the predetermined time Tk, the program proceeds to step 216. On the other hand, when the timer Ta is equal to or above the predetermined time Tk, it is determined that a predetermined time Tk has passed since the master cylinder hydraulic pressure Pma has been maintained at an approximately or substantially fixed pressure value. Therefore, the program proceeds to step 221 to turn OFF the operation of the electric motor M. The program then returns to the routine shown in FIG. 3 after the braking determination demand flag Fd is reset to zero at step 222.

The operation controls associated with the electric motor M at a motor operation start time, at a motor operation terminate time and at a motor operation restart time are described below with reference to the flow chart illustrated in FIG. 4.

When the auto-braking control is commenced, the electric motor M has been OFF in which the master cylinder hydraulic pressure Pma(n) at this time is equal to the previous master cylinder hydraulic pressure Pma(n−1). Therefore, the program proceeds from step 214 to step 218 to commence the count up of the timer Ta. At this the time, the timer Ta is still below the predetermined time Tk. Therefore, the program proceeds from step 219 to step 216 to drive or operate the electric motor M. At the next cycle, the electric motor M has been ON and the master cylinder hydraulic pressure Pma has been increasing. Therefore, the program proceeds from step 214 to step 215 to clear the timer Ta. Further, the program proceeds to step 216 to maintain the electric motor M in the turned ON condition.

After the auto-braking control is commenced, the power hydraulic pressure is adjusted by the linear solenoid valves V1, V2 based upon the electric current. If the master cylinder hydraulic pressure meets the target master cylinder hydraulic pressure corresponding to the electric current and is maintained at a constant pressure level, the timer Ta is counted up. When the timer Ta becomes equal to or above the predetermined time Tk, the electric motor M is turned OFF. Further, referring to steps 215 and 220 in FIG. 4, the timer Ta is cleared to zero when the master cylinder hydraulic pressure Pma is increased or decreased before the predetermined time Tk has passed.

When the target master cylinder hydraulic pressure is increased and the electric current It(n) becomes larger than the electric current It(n−1) while the auto-braking control is being performed, the timer Ta is cleared at step 210 and the timer Ta becomes below the predetermined Time Tk. Therefore, the electric motor M is turned OFF at step 221.

The auto-braking control mentioned above includes brake steering control for restraining an oversteer or an understeer of the vehicle, a traction control for restraining acceleration slip of a driving wheel when the vehicle is accelerated, a vehicle distance control for controlling a vehicle distance from the vehicle towards a forward running vehicle, and a down-hill control for controlling a vehicle speed to a predetermined vehicle speed while the vehicle is running on a down-hill.

Figure 5:
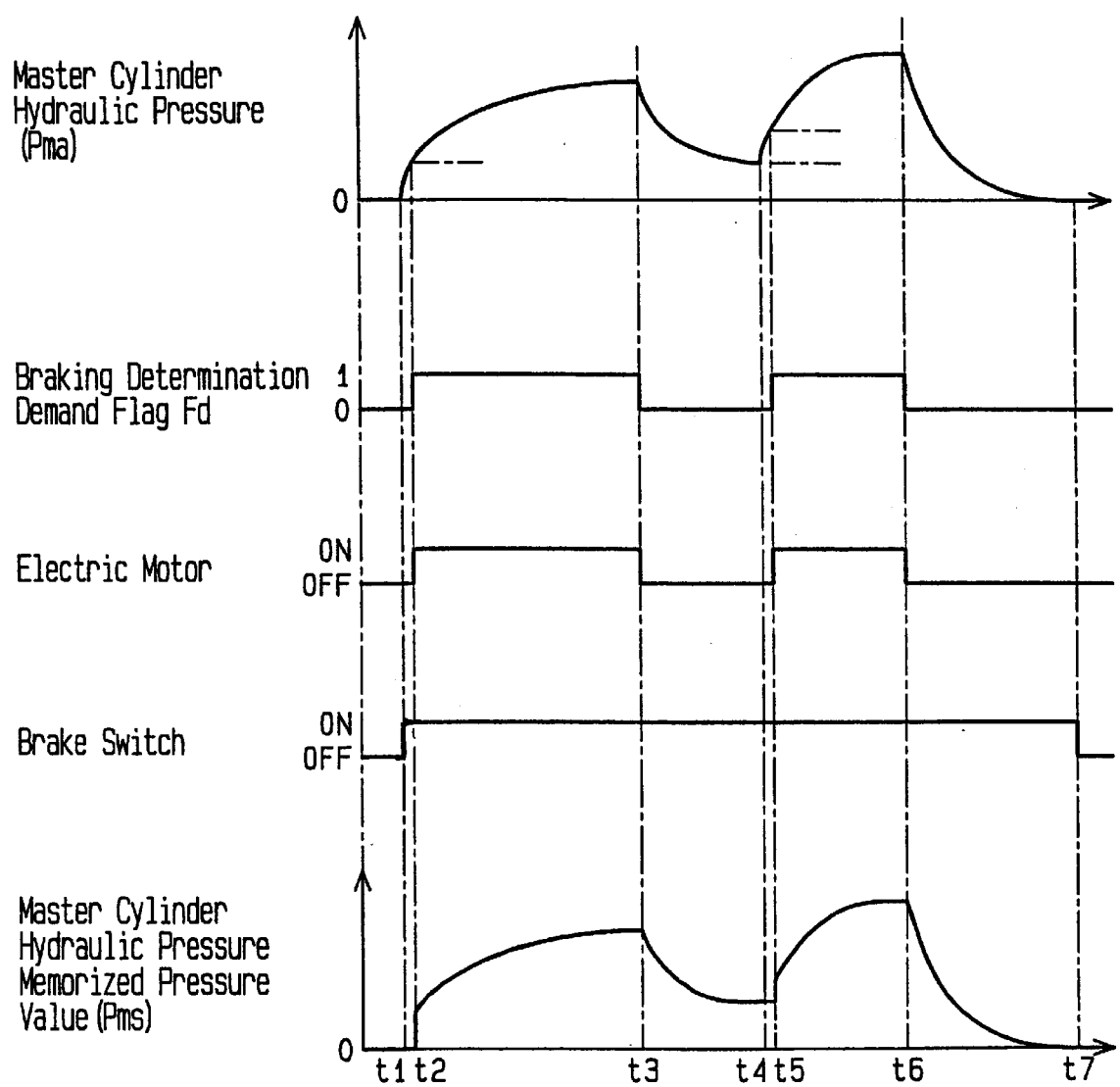
FIG. 5 is a graph illustrating an example of an operation control of the electric motor for a hydraulic pressure pump.

FIG. 5 shows an example of the operation control of the electric motor M when the normal braking operation is performed (corresponding to steps 202 and the following steps in FIG. 4). The brake pedal BP is determined to have been under the depressing operation from a time t1 when the brake pedal BP is depressed and the brake switch BS is turned ON to the time t7 when the brake pedal BP is released from the depressing operation and the brake switch BS is turned OFF. That is, a range between time t1 and time t7 does not always include a state where a sequential depressing operation has been applied to the brake pedal BP. The range therebetween also includes a state where the brake pedal BP has been maintained under a slightly depressed condition. Therefore, the braking determination demand flag Fd is set at "1" when the master cylinder hydraulic pressure Pma surpasses the threshold pressure value (Pms+Pn) after the brake pedal is depressed at the time t1. In this case, the electric motor is turned ON and the operation of the hydraulic pressure pump HP (shown in FIG. 1) is commenced.

The master piston MP is driven by the hydraulic pressure outputted from the regulating means RG. When the reaction force of the force of the master cylinder MC relative to the master piston MP becomes equal to the hydraulic pressure outputted from the regulating means RG, the difference (Pma(n)−Pma(n−1)) will be below a predetermined value K2 for a predetermined period of time and is determined at time t3 to be stabilized at a substantially or approximately fixed pressure value. The electric motor M is turned OFF and the operation of the hydraulic pressure pump HP is interrupted under the braking determination demand flag Fd being reset to zero. Therefore, the master cylinder hydraulic pressure Pma is decreased. In the meantime, the brake pedal BP has been under the depressed condition with the brake switch BS turned ON. When the brake pedal is depressed at time t4 under the above described condition, the master cylinder hydraulic pressure Pma exceeds the threshold pressure value (Pms+Pn) at time t5. In this case, the braking determination demand flag Fd is set at "1" again and the hydraulic pressure pump HP is again operated by the electric motor M.

Figure 6:
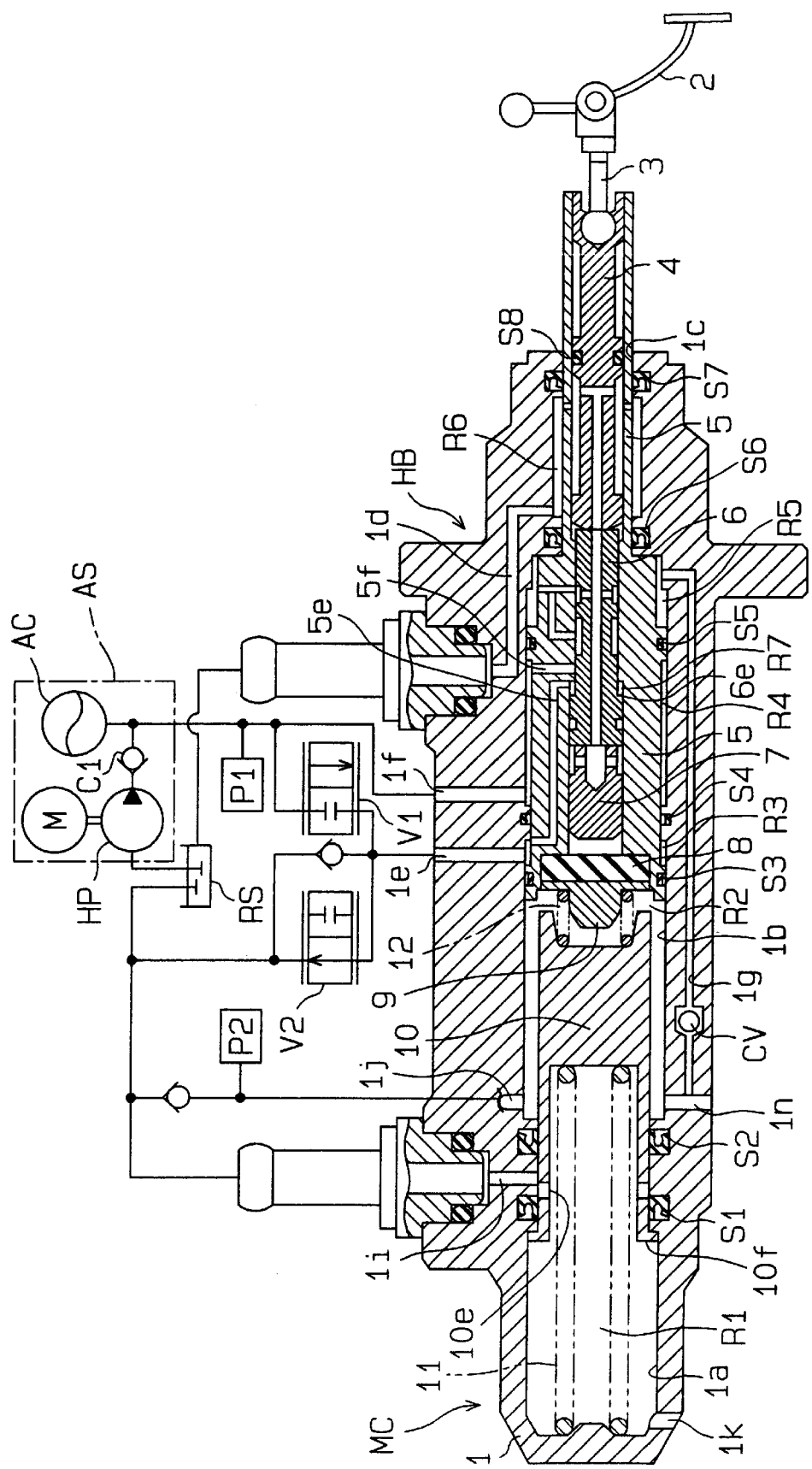
FIG. 6 is a cross-sectional view of the overall structure of the hydraulic brake apparatus according to an embodiment of the invention.

FIGS. 6 and 7 show a hydraulic brake apparatus according to embodiments of the invention. The inlet side of the auxiliary hydraulic pressure source AS is connected to the reservoir RS and the outlet side of the auxiliary hydraulic pressure source AS is connected to the accumulator AC via a check valve C1. The depressing force applied to a brake pedal 2 (corresponding to the brake pedal BP in FIG. 1) is transmitted via an input rod 3 as a brake operating force. A brake hydraulic pressure is boosted by a hydraulic pressure booster HB (corresponding to the regulating means RG in FIG. 1) corresponding to the movement of the input rod 3 and is outputted from the master cylinder MC to a wheel brake cylinder mounted on each respective vehicle wheel. The overall structure of the hydraulic brake apparatus is shown in FIG. 6 and the hydraulic pressure booster or hydraulically actuated booster device HB forming the regulating means of the hydraulic brake apparatus is illustrated in a slightly enlarged form in FIG. 7.

Referring to FIG. 6, a housing 1 includes a cylinder bore 1a and a cylinder bore 1b, with the diameter of the cylinder bore 1b being larger than the diameter of the cylinder bore 1a. A master piston 10 in the form of a cylindrical structure having a bottom at one end and a power piston 5 are accommodated in series in the housing 1. Annular cup like sealing members S1, S2 are disposed at the front side in the housing 1. The master piston 10 is hermetically and slidably supported via the sealing members S1, S2 so that a first pressure chamber R1 is defined in front of the master piston 10. The power piston 5 is disposed behind the master piston 10 in the housing 1 and is hermetically and slidably supported by an opening portion 1c defined at one end side of the housing 1 so that a second pressure chamber R2 is defined between the master piston 10 and the power piston 5.

Fluid supply ports 1i, 1j and fluid outlet ports 1k, 1n are defined in the housing 1. The outlet port 1k is connected to the first pressure chamber R1 and each wheel brake cylinder mounted at each respective vehicle front wheel. The outlet port 1n is connected to the second pressure chamber R2 and each wheel brake cylinder mounted at each respective vehicle rear wheel.

A return spring 11 is disposed between the front surface in the housing 1 and a recessed bottom portion of the master piston 10 to bias the master piston 10 in a rearward direction (i.e., to the right in FIG. 6). An engaging portion 10f is formed at the front end of the master piston 10 and is bent outwardly. The engaging portion 10f engages a stepped portion in the housing 1 to limit rearward movement of the master piston 10. When the master piston 10 is not activated and is positioned at a rear end position, the first pressure chamber R1 communicates with the reservoir RS via the fluid supply port 1i and a communicating hole 10e defined at a skirt portion of the master piston 10.

Referring to FIG. 7, a sealing member S3 is disposed in a land portion 5x formed at the front side of the power piston 5 and a sealing member S5 is disposed in a land portion 5y formed at the rear side of the power piston 5. A sealing member S4 is disposed between the sealing members S3, S5 at the inner surface of the housing 1. Further, annular cup-like sealing members S6, S7 are disposed with a predetermined distance between the two sealing members S6, S7 at one end side in the housing 1. An annular chamber R6 is defined between the inner surface of the housing 1 between the sealing members S6, S7 and the outer surface of the power piston 5. The housing 1 is required to be shaped from a plurality of cylinders and the power piston 5 is required to be shaped from two separated members in order to dispose the sealing members S1, S2, S3, S4, S5, S6, S7 as described above and illustrated in FIGS. 6 and 7.

However, as this construction is a matter known to persons in the art, the housing 1 and the power piston 5 are respectively described as a single unit for purposes of simplifying the description here.

The second pressure chamber R2 is defined between the sealing members S2, S3, an annular chamber R3 is defined between the sealing members S3, S4, an annular chamber R4 is defined between the sealing members S4, S5, and a power chamber R5 is defined between the sealing members S5, S6. A recessed portion 5a is defined at the front side of the power piston 5 and a cylindrical portion 5b with a stepped portion is defined behind the recessed portion 5a in the power piston 5. A communicating hole 5e defined in the power piston 5 connects the cylindrical portion 5b with the annular chamber R3. A communicating hole 5f defined in the power piston 5 communicates with the annular chamber R4. Communicating holes 5g, 5h defined in the power piston 5 communicate with the power chamber R5. A communicating hole 5d defined in the power piston 5 communicates with the annular chamber R6.

An input member 4 is hermetically and slidably accommodated via a sealing member S8 at one end side in the cylindrical portion 5b. The input rod 3 is operatively connected to an end portion of the input member 4. An axially extending communicating hole 4c in the input member 4 communicates with a drain port 1d via a radially extending communicating hole 4d in the input member 4, an annular groove 4e formed on the outer surface of the input member 4, the communicating hole 5d and the annular chamber R6. A spool 6 is hermetically and slidably supported via a sealing member S9 in the cylindrical portion 5b at a position in front of the input member 4. Further, a plunger 7 is slidably accommodated in front of the spool 6. A rubber made reaction disc 8 is disposed in the recessed portion 5a and serves as an elastic member for transmitting a reaction force. A pressure receiving member 9 is accommodated in contact with a front surface of the reaction disc 8 and is movable back and forth. A return spring 12 is disposed between the master piston 10 and the pressure receiving member 9 to effect a direct force transmission between the master piston 10 and the pressure receiving member 9. A slight clearance is defined between the reaction disc 8 and the front end surface of the plunger 7 under a non-operative condition as illustrated in FIGS. 6 and 7.

As shown in FIG. 7, an axially extending communicating hole 6c is defined in the spool 6 and a stepped portion 6e is formed at the outer surface of the spool 6. Annular grooves 6f, 6g are defined at the outer surface of a smaller diameter portion of the spool 6. The communicating hole 6c communicates with the annular groove 6g via a radially extending communicating hole 6h in the spool 6. When the hydraulic brake apparatus is not activated as illustrated in FIG. 7, the annular grooves 6f, 6g face the opening portions of the communicating holes 5g, 5h, respectively. The power chamber R5 communicates with the communicating hole 6c via the communicating hole 5h, the annular groove 6g and the communicating hole 6h. When the spool 6 is moved in the forward direction, the communication between the power chamber R5 and the communicating hole 6c is interrupted. Further, the power chamber R5 communicates with an inlet port 1f via the communicating hole 5g, the annular groove 6f, and the communicating hole 5f.

A hydraulic pressure introducing chamber R7 is defined behind the stepped portion 6e. The hydraulic pressure outputted from the auxiliary hydraulic pressure source AS is supplied to the hydraulic pressure introducing chamber R7 via the communicating hole 5e when the automatic brake control is performed. Further, a hydraulic pressure chamber is defined between a rear end of the spool 6 and the input member 4. The hydraulic pressure chamber communicates with the reservoir RS and yet does not communicate with the hydraulic pressure introducing chamber R7.

An annular groove 7g is defined at the outer surface of the plunger 7. An axially extending hole 7e in the plunger 7 opens in the rearward direction and faces an opening portion of the communicating hole 6c of the spool 6. The hole 7e communicates with the annular groove 7g via a radially extending communicating hole 7f defined in the plunger 7. Therefore, a space in which is disposed the plunger 7 communicates with the drain port 1d via the communicating hole 6c, the communicating holes 4c, 4d, the annular groove 4e, the communicating hole 5d, and the annular chamber R6.

Several inlet ports 1e, 1f and the drain port 1d are defined at the rear side of the housing 1. The drain port 1d communicates with the reservoir RS. The inlet ports 1e, 1f communicate with the auxiliary hydraulic pressure source AS. The inlet port 1e communicates with the annular chamber R3, communicates with the auxiliary hydraulic pressure source AS via the linear solenoid valve V1, and communicates with the reservoir RS via the linear solenoid valve V2. The inlet side of the auxiliary hydraulic pressure source AS communicates with the reservoir RS. The outlet side of the auxiliary hydraulic pressure source AS communicates with the accumulator AC via the check valve C1 and then communicates with the inlet port 1f. As described above, the outlet side of the auxiliary hydraulic pressure source AS further communicates with the inlet port 1e via the solenoid valve V1.

Further, according to the illustrated embodiment, a fluid passage 1g is defined in the housing 1 for connecting the second pressure chamber R2 and the power chamber R5. A normally open-type pressure differential responsive check valve CV (hereinafter referred to as a check valve CV) is disposed in the fluid passage 1g. The check valve CV normally connects the second pressure chamber R2 with the power chamber R5. The check valve CV is operated to be closed in response to a pressure differential between the power chamber R5 and the second pressure chamber R2. When the hydraulic pressure in the power chamber R5 is larger than the hydraulic pressure in the second pressure chamber R2 and when the pressure differential is equal to or above a predetermined value, the communication between the power chamber R5 and the second pressure chamber R2 is interrupted by the closed check valve CV. On the other hand, when the hydraulic brake apparatus is not activated, the pressure differential between the power chamber R5 and the second pressure chamber R2 is not generated, and the check valve CV is maintained at the open position. Therefore, when the pressure chamber R2 is required to be filled with brake fluid, an evacuation of the air in the second pressure chamber R2 can be performed easily and accurately by bleeding air from the power chamber R5 and by introducing the brake fluid from the reservoir RS via the fluid supply port 1j to the second pressure chamber R2.

The operation of the hydraulic brake apparatus having the construction described above and illustrated in the drawing figures is as follows. When the brake pedal 2 is under the non-operated condition, each component of the hydraulic brake apparatus is located at the initial position shown in FIGS. 6 and 7. In this case, the hydraulic pressure booster HB is under the non-operated condition with the linear solenoid valve V1 at the closed position and the linear solenoid valve V2 at the open position. Under the above condition, the annular chamber R4 communicates with the accumulator AC, while communication between the communicating hole 5f and the power chamber R5 is blocked by the spool 6. The power chamber R5 communicates with the reservoir RS via a communicating hole 5h, the annular groove 6g, the communicating holes 6h, 6c, the communicating holes 4c, 4d, the annular groove 4e, the communicating hole 5d, the annular chamber R6, and the drain port 1d. The power chamber R5 further communicates with the second pressure chamber R2 via the fluid passage 1g and the check valve CV. Therefore, when the auxiliary hydraulic pressure source AS is driven, the power piston 5 is applied only with a rearward pushing force by the hydraulic pressure in the annular chamber R4 so as to be maintained at the initial position illustrated in FIGS. 6 and 7.

When the brake pedal 2 is operated, the spool 6 is moved in the forward direction corresponding to the forward movement of the input member 4, thereby interrupting communication between the power chamber R5 and the communicating hole 6c via the communicating hole 5h which is blocked by the spool 6. The annular groove 6f faces the opening portions of the communicating holes 5f, 5g. Therefore, the power hydraulic pressure is fed into the power chamber R5 via the inlet port 1f, the communicating hole 5f, the annular groove 6f, and the communicating holes 5g, 5h. The inlet port 1e communicates with the hydraulic pressure introducing chamber R7 via the annular chamber R3 and the communicating hole 5e. The linear solenoid valve V1 is still at the closed position and the linear solenoid valve V2 is still at the open position. The inlet port 1e communicates with the reservoir RS via the linear solenoid valve V2. Therefore, the spool 6 is moved forward in response to the forward movement of the input member 4, i.e., in response to the brake pedal operation. When the pressure differential between the power chamber R5 and the second pressure chamber R2 becomes equal to or above the predetermined value under the above condition, the check valve CV is operated to be closed. Because the fluid passage 1g is interrupted by the check valve CV, the second pressure chamber R2 becomes a hydraulically sealed space filled with the brake fluid.

As described above, while the hydraulic pressure booster HB has been activated after the second pressure chamber R2 becomes the hydraulically sealed space, a pushing pressure applied to a front end surface of the power piston 5 by the second pressure chamber R2 is balanced relative to the brake pedal operating force and a pushing pressure applied to a rear end surface of the poser piston 5. The effective cross-section of the power piston 5 is larger than the effective cross-section of the master piston 10 so that the clearance between the master piston 10 and the power piston 5 is enlarged by the forward movement of the master piston 10 corresponding to the forward movement of the power piston 5. In this case, the master piston 10 is hydraulically connected to the power piston 5 and is moved integrally with the power piston 5. As described above, when the hydraulic pressure booster HB is activated, the power piston 5 and the master piston 10 are hydraulically integrated by the brake fluid filled in the second pressure chamber R2. The power piston 5 and the master piston 10 are integrally moved forward by the clearance defined between the power piston 5 and the master piston 10. Therefore, the stroke of the brake pedal 2 is reduced.

When the automatic brake control is performed with the brake pedal 2 (shown in FIG. 6) under the non-operated condition, the auxiliary hydraulic pressure source AS is activated with the solenoid valve V1 at the open position and the solenoid valve V2 at the closed position. Each component is still located at the initial position shown in FIG. 7 immediately after the automatic brake control is performed. Therefore, communication between the communicating hole 5f and the power chamber R5 is interrupted by the spool 6. The hydraulic pressure outputted from the auxiliary hydraulic pressure source AS is supplied to the hydraulic pressure introducing chamber R7 via the inlet port 1e and the communicating hole 5e. That is, the power chamber R5 communicates with the auxiliary hydraulic pressure source AS via the communicating hole 5g, the annular groove 6f, the communicating hole 5f and the inlet port 1f. Therefore, the master piston 10 is moved forward corresponding to the forward movement of the power piston 5 so that the brake hydraulic pressure is supplied to each wheel brake cylinder mounted on each vehicle wheel.

Under the above condition, the fluid passage 1g is interrupted by the check valve CV being at the closed position corresponding to the pressure differential between the power chamber R5 and the second pressure chamber R2 so that the second pressure chamber R2 becomes the hydraulically sealed space filled with brake fluid. Therefore, the master piston 10 is moved forward in response to the pushing force corresponding to the effective area of the power piston 5 by the brake hydraulic pressure introduced into the power chamber R5. Therefore, when the brake pedal 2 is under the non-operative condition, a desired brake hydraulic pressure can be generated by controlling the auxiliary hydraulic pressure source AS and the linear solenoid valves V1, V2 when needed. The brake hydraulic pressure in the second pressure chamber R2 is applied to the pressure receiving member 9 and the reaction disc 8. A forward area of the input member 4 communicates with the reservoir RS via the drain port 1d. Therefore, the reaction force of the pushing force applied to the pressure receiving member 9 and the reaction disc 8 is not transmitted to the input member 4. The pushing force applied to the pressure receiving member 9 and the reaction disc 8 is opposed by the power hydraulic pressure outputted from the auxiliary hydraulic pressure source AS to the power piston 5. Further, the power hydraulic pressure outputted from the auxiliary hydraulic pressure source AS is fed into the hydraulic pressure introducing chamber R7 defined between the stepped portion 6e and the power piston 5. The hydraulic pressure introducing chamber R7 is structurally separated from the front chamber of the input member 4. Therefore, the power hydraulic pressure fed into the hydraulic pressure introducing chamber R7 from the auxiliary hydraulic pressure source AS is not transmitted to the input member 4 as the reaction force.

As described above, the electric motor is ON from the time t1 at which the brake switch BS is turned ON to the time t7 at which the brake switch BS is turned OFF. Therefore, the hydraulic pressure pump is sequentially operated. However, the electric motor M can be driven in response to the change of the master cylinder hydraulic pressure Pma. That is, the electric motor M can be operated appropriately in response to a consumption of the brake hydraulic pressure.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A hydraulic brake apparatus for a vehicle comprising:
   a brake operating member;
   a master cylinder including a master piston which is movable in a forward direction in response to a depressing operation of the brake operating member for pressurizing brake fluid in a reservoir and outputting a master cylinder hydraulic pressure to a wheel brake cylinder mounted on a vehicle wheel in response to movement of the master piston in the forward direction;
   an auxiliary hydraulic pressure source which pressurizes the brake fluid in the reservoir to a first predetermined pressure level and outputs a power hydraulic pressure;
   regulating means connected with the auxiliary hydraulic pressure source and the reservoir for regulating the power hydraulic pressure outputted from the auxiliary hydraulic pressure source to a second predetermined pressure level, for driving the master piston with the regulated power hydraulic pressure, and for terminating regulation of the power hydraulic pressure when the regulated hydraulic pressure becomes equal to a reaction force of the master cylinder relative to the master piston;
   hydraulic pressure detecting means for detecting the master cylinder hydraulic pressure; and
   control means for comparing a master cylinder hydraulic pressure detected by the hydraulic pressure detecting means with a predetermined pressure value, for implementing operation of the auxiliary hydraulic pressure source when depressing operation of the brake operating member is judged in a stage where the master cylinder hydraulic pressure detected by the hydraulic pressure detecting means is above the predetermined pressure value, and for terminating the operation of the auxiliary hydraulic pressure source when the master cylinder hydraulic pressure detected by the hydraulic pressure detecting means is stabilized at a substantially fixed pressure value after being increased.

2. The hydraulic brake apparatus for a vehicle according to claim 1, wherein:
   the hydraulic pressure detecting means detects the master cylinder hydraulic pressure every predetermined fixed period of time;
   the control means compares a difference between the master cylinder hydraulic pressure detected by the hydraulic pressure detecting means at a previous time and the master cylinder hydraulic pressure detected by the hydraulic pressure detecting means at a present time with a predetermined value; and
   the control means terminates operation of the auxiliary hydraulic pressure source when the difference is below the predetermined value.

3. The hydraulic brake apparatus for a vehicle according to claim 2, wherein the control means terminates operation of the auxiliary hydraulic pressure source when the difference is maintained between the predetermined value and zero for a predetermined period of time.

4. The hydraulic brake apparatus for a vehicle according to claim 1, wherein the auxiliary hydraulic pressure source includes a pump and electric motor.

5. The hydraulic brake apparatus for a vehicle according to claim 1, wherein the regulating means includes a hydraulically actuated booster device for regulating the power hydraulic pressure.

6. A hydraulic brake apparatus for a vehicle comprising:
   a brake operating member;
   a master cylinder including a master piston which is movable in a forward direction in response to a depressing operation of the brake operating member for pressurizing brake fluid in a reservoir and outputting a master cylinder hydraulic pressure to a wheel brake cylinder mounted on a vehicle wheel in response to movement of the master piston in the forward direction;
   an auxiliary hydraulic pressure source which pressurizes the brake fluid in the reservoir to a predetermined pressure level and outputs a power hydraulic pressure;
   master piston driving means for driving the master piston with the power hydraulic pressure outputted from the auxiliary hydraulic pressure source;
   a linear solenoid valve which controls the power hydraulic pressure supplied to the master piston driving means from the auxiliary hydraulic pressure source;
   control means for performing an operation control of the linear solenoid valve based upon predetermined electric current regardless of the depressing operation of the brake operating member to effect auto-braking control by adjusting the master cylinder hydraulic pressure;
   hydraulic pressure detecting means for detecting the master cylinder hydraulic pressure; and
   the control means controlling operation of the auxiliary hydraulic pressure source during auto-braking control and terminating operation of the auxiliary hydraulic pressure source when the master cylinder hydraulic pressure detected by the hydraulic pressure detecting means is maintained at a substantially fixed pressure value after being increased.

7. The hydraulic brake apparatus for a vehicle according to claim 6, wherein:
   the hydraulic pressure detecting means detects the master cylinder hydraulic pressure every predetermined fixed period of time;
   the control means compares a difference between the master cylinder hydraulic pressure detected by the hydraulic pressure detecting means at a previous time and the master cylinder hydraulic pressure detected by the hydraulic pressure detecting means at a present time with a predetermined value, and terminates the operation of the auxiliary hydraulic pressure source when the difference is below the predetermined value.

8. The hydraulic brake apparatus for a vehicle according to claim 7, wherein the control means terminates operation of the auxiliary hydraulic pressure source when the difference is maintained between the predetermined value and zero for a predetermined period of time.

9. The hydraulic brake apparatus for a vehicle according to claim 6, wherein the regulating means includes a hydraulically actuated booster device for regulating the power hydraulic pressure.

10. The hydraulic brake apparatus for a vehicle according to claim 6, wherein the auto-braking control includes at least one of brake steering control for restraining an oversteer or an understeer of the vehicle, traction control for restraining an acceleration slip of a driving wheel when the vehicle is accelerated, vehicle distance control for controlling a vehicle distance from the vehicle towards a forward running vehicle, and down-hill control for controlling a vehicle speed to be a predetermined vehicle speed while the vehicle is running down-hill.

11. A method of effecting hydraulic braking for a vehicle comprising:

pressurizing brake fluid in a reservoir through forward movement of a master piston in a master cylinder in response to a depressing operation of the brake operating member to output a master cylinder hydraulic pressure to a wheel brake cylinder mounted on a vehicle wheel;

detecting the master cylinder hydraulic pressure;

pressurizing the brake fluid in the reservoir to a first predetermined pressure level through operation of an auxiliary hydraulic pressure source to output a power hydraulic pressure;

regulating the outputted power hydraulic pressure to a second predetermined pressure level to produce a regulated power hydraulic pressure and terminating regulation of the power hydraulic pressure when the regulated hydraulic pressure becomes equal to a reaction force of the master cylinder relative to the master piston;

driving the master piston with the regulated power hydraulic pressure;

comparing the detected master cylinder hydraulic pressure with a predetermined pressure value;

operating the auxiliary hydraulic pressure source when depression of the brake operating member is judged to be in a stage in which the detected master cylinder hydraulic pressure is greater than the predetermined pressure value; and terminating operation of the auxiliary hydraulic pressure source when the detected master cylinder hydraulic pressure is stabilized at a substantially fixed pressure value after being increased.

12. The method according to claim 11, wherein the master cylinder hydraulic pressure is detected every predetermined fixed period of time.

13. The method according to claim 11, including comparing a difference between the master cylinder hydraulic pressure detected at a previous time and the master cylinder hydraulic pressure detected at a present time with a predetermined value, and terminating operation of the auxiliary hydraulic pressure source when the difference is below the predetermined value.

14. The method according to claim 11, including comparing a difference between the master cylinder hydraulic pressure detected at a previous time and the master cylinder hydraulic pressure detected at a present time with a predetermined value, and terminating operation of the auxiliary hydraulic pressure source when the difference is maintained between the predetermined value and zero for a predetermined period of time.

15. The method according to claim 11, wherein the outputted power hydraulic pressure is regulated to the second predetermined pressure level through operation of a hydraulically actuated booster device.

* * * * *